United States Patent [19]

Feuerbaum

[11] Patent Number: 4,514,682

[45] Date of Patent: Apr. 30, 1985

[54] SECONDARY ELECTRON SPECTROMETER FOR MEASURING VOLTAGES ON A SAMPLE UTILIZING AN ELECTRON PROBE

[75] Inventor: Hans-Peter Feuerbaum, Munich, Fed. Rep. of Germany

[73] Assignee: Siemens Aktiengesellschaft, Berlin and Munich, Fed. Rep. of Germany

[21] Appl. No.: 398,542

[22] Filed: Jul. 15, 1982

[30] Foreign Application Priority Data

Sep. 30, 1981 [DE] Fed. Rep. of Germany ....... 3138929

[51] Int. Cl.$^3$ ............................................ G01N 27/00

[52] U.S. Cl. .................................. 324/71.3; 250/310; 324/409

[58] Field of Search ............... 324/71.3, 73 R, 73 PC, 324/158 P, 403, 404, 409–412; 250/305, 310, 397

[56] References Cited

U.S. PATENT DOCUMENTS

| | | | |
|---|---|---|---|
| 2,946,002 | 7/1960 | Russell | 324/409 |
| 3,445,708 | 5/1969 | Webster | 250/310 |
| 3,448,377 | 6/1969 | Seiwatz et al. | 324/73 PC |
| 3,531,716 | 9/1970 | Tarui et al. | 324/73 PC |
| 3,549,999 | 12/1970 | Norton | 324/73 PC |
| 3,760,180 | 9/1973 | Weber | 250/310 |
| 3,796,947 | 3/1974 | Harrod et al. | 324/158 P |
| 4,179,604 | 12/1979 | Christou | 250/310 |
| 4,355,232 | 10/1982 | Todokoro et al. | 250/310 |
| 4,417,203 | 11/1983 | Pfeiffer et al. | 324/71.3 |

OTHER PUBLICATIONS

H.-P. Feuerbaum, "VLSI Testing Using the Electron Probe", *Scanning Electron Microscopy* 1979 pp. 285–296.

*Primary Examiner*—Stewart J. Levy
*Attorney, Agent, or Firm*—Hill, Van Santen, Steadman & Simpson

[57] ABSTRACT

An improved secondary electron spectrometer for measuring voltages occurring on a specimen, such as an integrated circuit chip, utilizing an electron probe has a grating structure for measuring the energy distribution of the secondary electrons independently of the angular distribution of the secondary electrons at the measuring point on the specimen. If the secondary electron spectrometer has an extraction electrode and a deceleration electrode, the grating structure is spherically symmetric.

1 Claim, 1 Drawing Figure

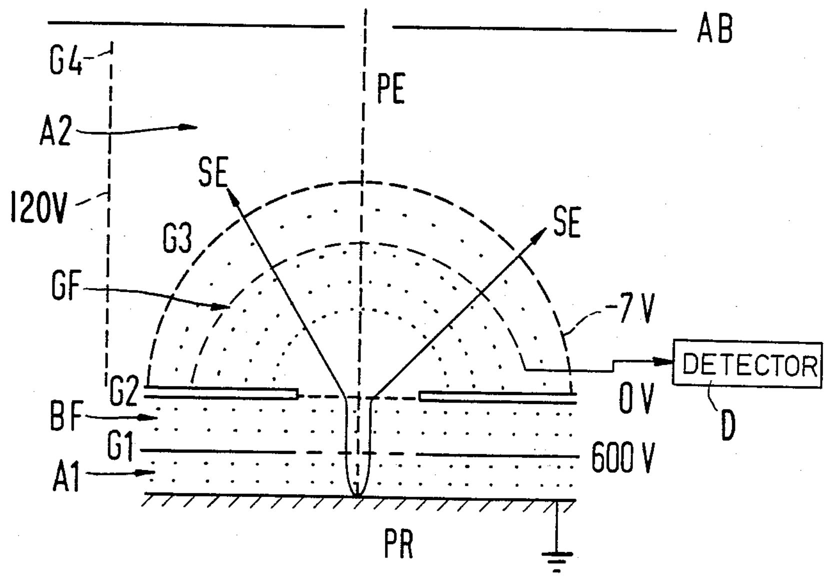
...ÄL

SECONDARY ELECTRON SPECTROMETER FOR MEASURING VOLTAGES ON A SAMPLE UTILIZING AN ELECTRON PROBE

BACKGROUND OF THE INVENTION

1. Field of the Invention

The present invention relates to an improvement in a secondary electron spectrometer utilizing an electron beam probe.

2. Description of the Prior Art

The use of secondary electron spectrometers for undertaking voltage measurements at various locations of very small specimens, such as an integrated circuit chip, which utilize an electron probe is described, for example, in an article by the inventor herein entitled "VLSI Testing Using the Electron Probe," Scanning Electron Microscopy/1979, pages 285–296. The basic principle utilized in conducting voltage measurements at various circuit nodes utilizing an electron beam probe is that the voltage present at the circuit node causes the emission of secondary electrons, with the energy of the emitted secondary electrons being an indication of the voltage at the measurement point. The secondary electrons emitted at the sample pass through an extraction field and are subsequently decelerated in a homogenous opposing field. The result obtained from this conventional opposing field spectrometer is an integral energy distribution. The angle distribution of the secondary electrons is, however, not taken into consideration in such conventional devices. The angle distribution may, however, be changed due to electrostatic microfields at the surface of the specimen, that is, when the potential changes at the measurement point the local microfield at the specimen surface also changes, as does the angle distribution of the secondary electrons. Because secondary electron spectrometers of the type described in the above-identified article do not perceive the change in the angular distribution of the secondary electrons, measuring errors of approximately 5% through 10% occur.

SUMMARY OF THE INVENTION

It is an object of the present invention to provide a secondary electron spectrometer utilizing an electron beam probe which has an improved measuring precision by virtue of the inclusion of a means for measuring the energy distribution of the secondary electrons independently of the angular distribution of the secondary electrons at the measuring point on the sample.

In addition to improved measuring precision, a secondary electron spectrometer constructed in accordance with the principles of the present invention also exhibits marked measuring sensitivity.

BRIEF DESCRIPTION OF THE DRAWING

The single FIGURE is a side view of the operative portion of a secondary electron spectrometer constructed in accordance with the principles of the present invention.

DESCRIPTION OF THE PREFERRED EMBODIMENTS

A secondary electron spectrometer constructed in accordance with the principles of the present invention which takes the angular distribution of the emitted secondary electrons into consideration in undertaking a measurement of voltages at various points on a sample is shown in the FIGURE. This improved secondary electron spectrometer may be utilized in an electron beam measuring installation as is described in the above-identified article of the inventor.

In the secondary electron spectrometer disclosed and claimed herein, the secondary electrons SE are extracted from the sample PR, which may be an integrated circuit chip, by an extraction field A1 having a high field strength. The extraction field A1 is disposed between a first grating G1 and the specimen PR. The measuring points on the specimen PR are generally at zero potential in their non-activated state whereas, as is described in the above-identified article, the grating G1 is at a high potential such as, for example, 600 volts.

After passing through the extraction field A1, the secondary electrons SE traverse a decelerating opposing field BF disposed between the first grating G1 and a second grating G2. As is also known from the above-identified article, the grating G2 is at approximately the same potential as the measuring points on the specimen PR in their non-activated state.

The decelerating opposing field BF between the gratings G1 and G2 is of such a nature that the field only partially cancels the preceding acceleration imparted by the extraction field A1. Thus, all secondary electrons SE can traverse the grating G2 and exhibit an angular distribution which is identical to the angular distribution of the secondary electrons SE at the surface of the specimen PR. The energy distribution of the secondary electrons SE can then be measured without error, by taking the angular distribution of the secondary electrons into consideration, by means of a hemispherically symmetrical (isotropic) grating G3. The hemispherically symmetrical grating G3 is at a potential of approximately −7 volts in the sample embodiment shown in the drawing. The secondary electrons SE are then again accelerated by a second extraction field A2 by means of a further grating G4 toward a schematically represented detector D. The grating G4 is operated at substantially the same voltage as in the secondary electron spectrometer described in the article, i.e., 120 V. The secondary electron spectrometer is provided with shielding AB. The primary electrons PE of the electron beam which are incident upon the specimen PR generate secondary electrons SE with a specific angular distribution dependent on the potential at the measuring point on the specimen surface. Horizontal and arced equipotential lines within the secondary electron spectrometer are indicated by the aligned dots.

The device disclosed and claimed herein is particularly suited for quantitative voltage measurements taken at various nodes of an integrated circuit utilizing an electron probe.

A significant feature of the structure disclosed herein is the projection of the angular distribution of the secondary electrons SE existing at the specimen surface, which is dependent upon the potential appearing at the measuring point on the specimen surface, onto the plane of the grating G2. The secondary electrons SE exhibit essentially the same three-dimensional pulse distribution as at the measuring point on the specimen surface at the time the secondary electrons SE are first generated by the primary electrons PE. The secondary electrons SE are accelerated with this three-dimensional distribution after passage through the grating G2 in such a manner that the change in the angular distribution due to a potential change at the measuring point on the specimen surface does not falsify the measurement of the energy distribution of the secondary electrons SE at the detector. The secondary electrons SE are decelerated in the opposing field GF between the second grating G2 and the spherically symmetric isotropic grating G3 independently of their direction of travel and only as a function of their energy. The voltage of approximately −7 volts of the grating G3 is selected such that, given a voltage of the measuring points situated on the specimen PR of approximately 8 volts in the activated state (measuring points in their non-activated state being at zero potential) secondary electrons SE emitted at such activated measuring points still proceed to the second extraction field A2 independently of their direction of travel and subsequently proceed to a detector via the further grating G4.

The inventive concept disclosed and claimed herein is not restricted to the sample embodiment shown in the drawing. The distinguishing feature of the invention is an electron spectrometer which determines the energy distribution of the secondary electrons SE independently of their angular distribution. The effects of the gratings G1, G2 and G3 may also be achieved by means of only two appropriately shaped gratings, the first grating being designed as an extraction grating and the second grating being designed as a deceleration grating.

Although modifications and changes may be suggested by those skilled in the art it is the intention of the inventor to embody within the patent warranted hereon all changes and modifications as reasonably and properly come within the scope of this contribution to the art.

I claim as my invention:

1. A secondary electron spectrometer for detecting the energy distribution of secondary electrons from a measuring point on a sample independent of the angular distribution of said secondary electrons, said spectrometer inclucing an electron detector and comprising in sequence between said sample and said detector;

an extraction electrode generating an extraction field for accelerating said secondary electrons from said sample;

a deceleration electrode generating a deceleration field for decelerating said secondary electrons after passing through said extraction field;

a hemispherically symmetrical electrode generating another deceleration field for further decelerating said secondary electrons, said hemispherically symmetrical electrode isotropically decelerating said secondary electrons; and an acceleration electrode generating another extraction field for accelerating said secondary electrons toward said detector.

* * * * *